May 22, 1951  L. A. KEMPTON  2,553,769
DOUBLE MIXING VALVE
Filed Jan. 2, 1947  6 Sheets-Sheet 1
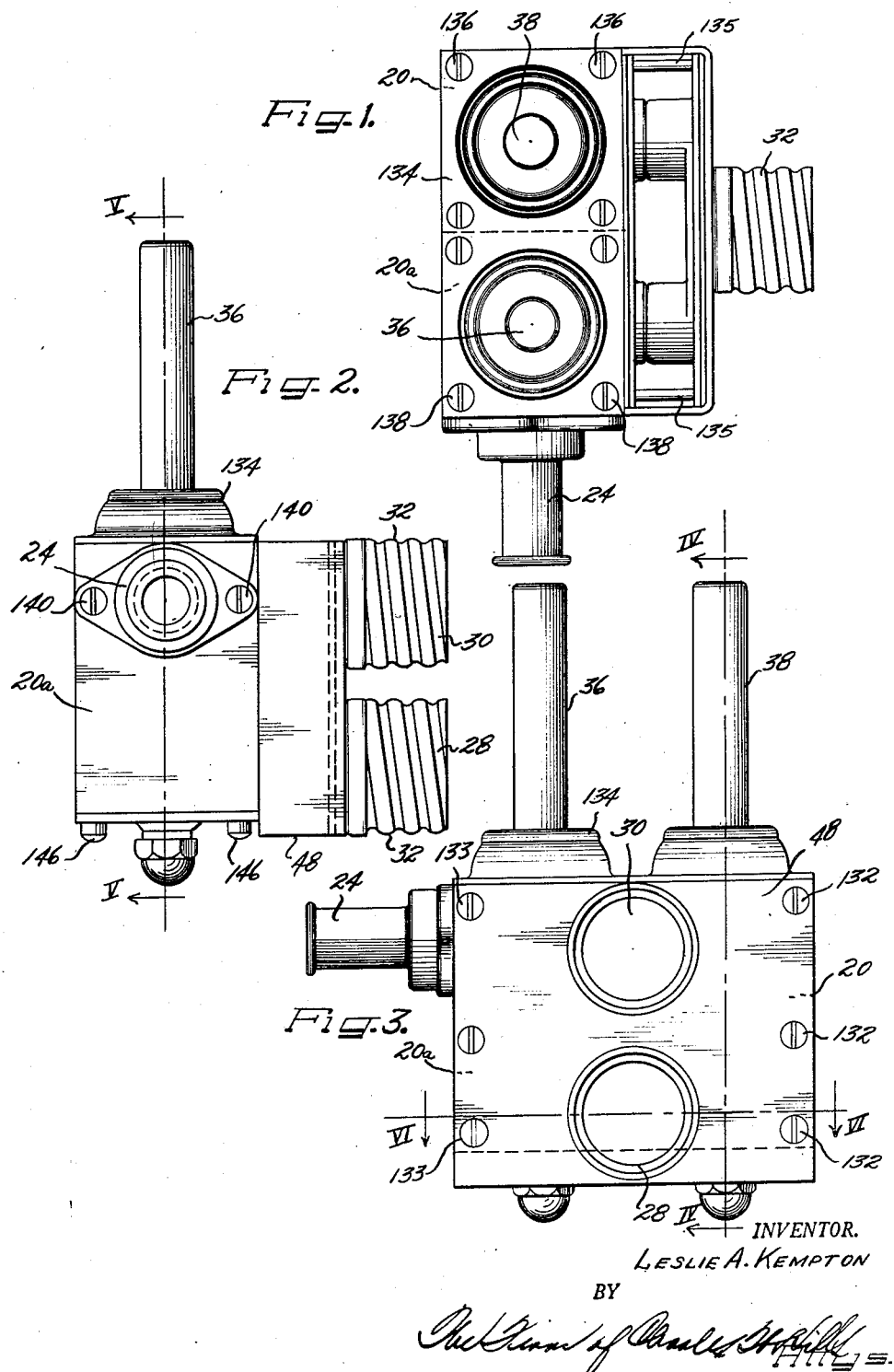
INVENTOR.
LESLIE A. KEMPTON
BY May 22, 1951 L. A. KEMPTON 2,553,769
DOUBLE MIXING VALVE
Filed Jan. 2, 1947 6 Sheets-Sheet 2
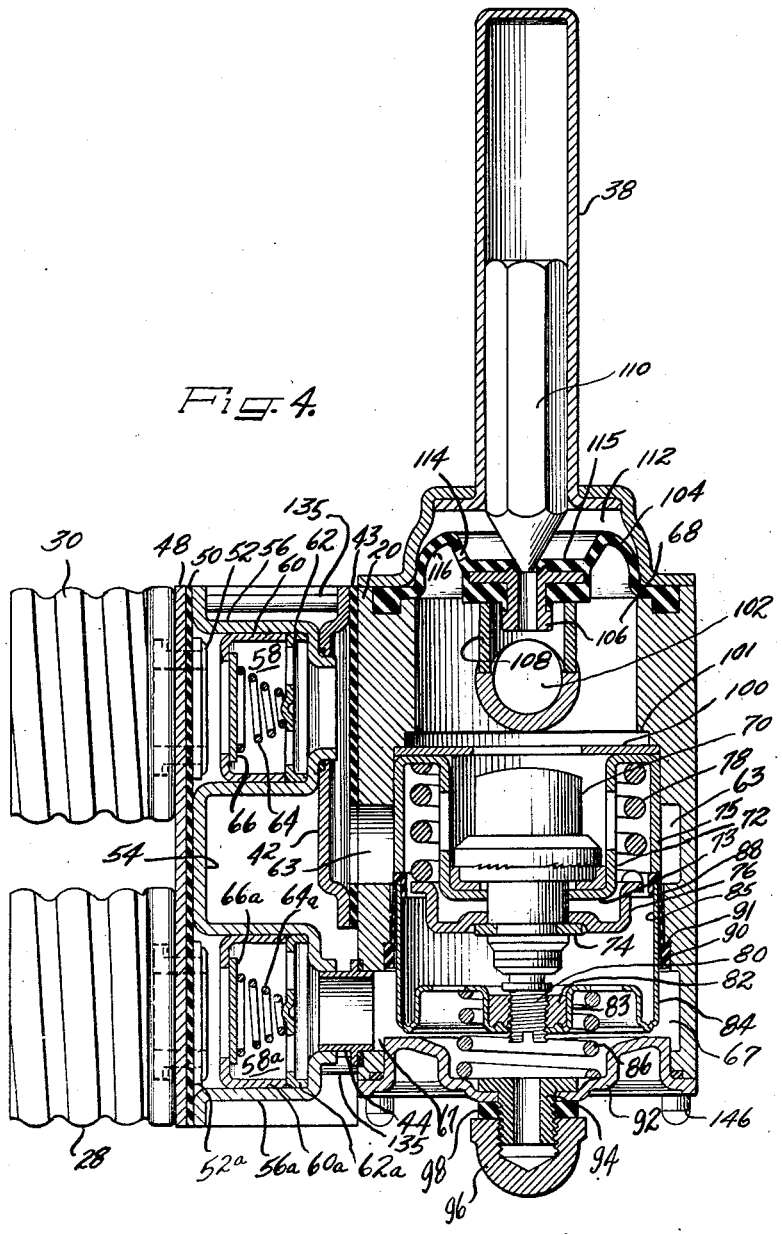
INVENTOR.
LESLIE A. KEMPTON
BY

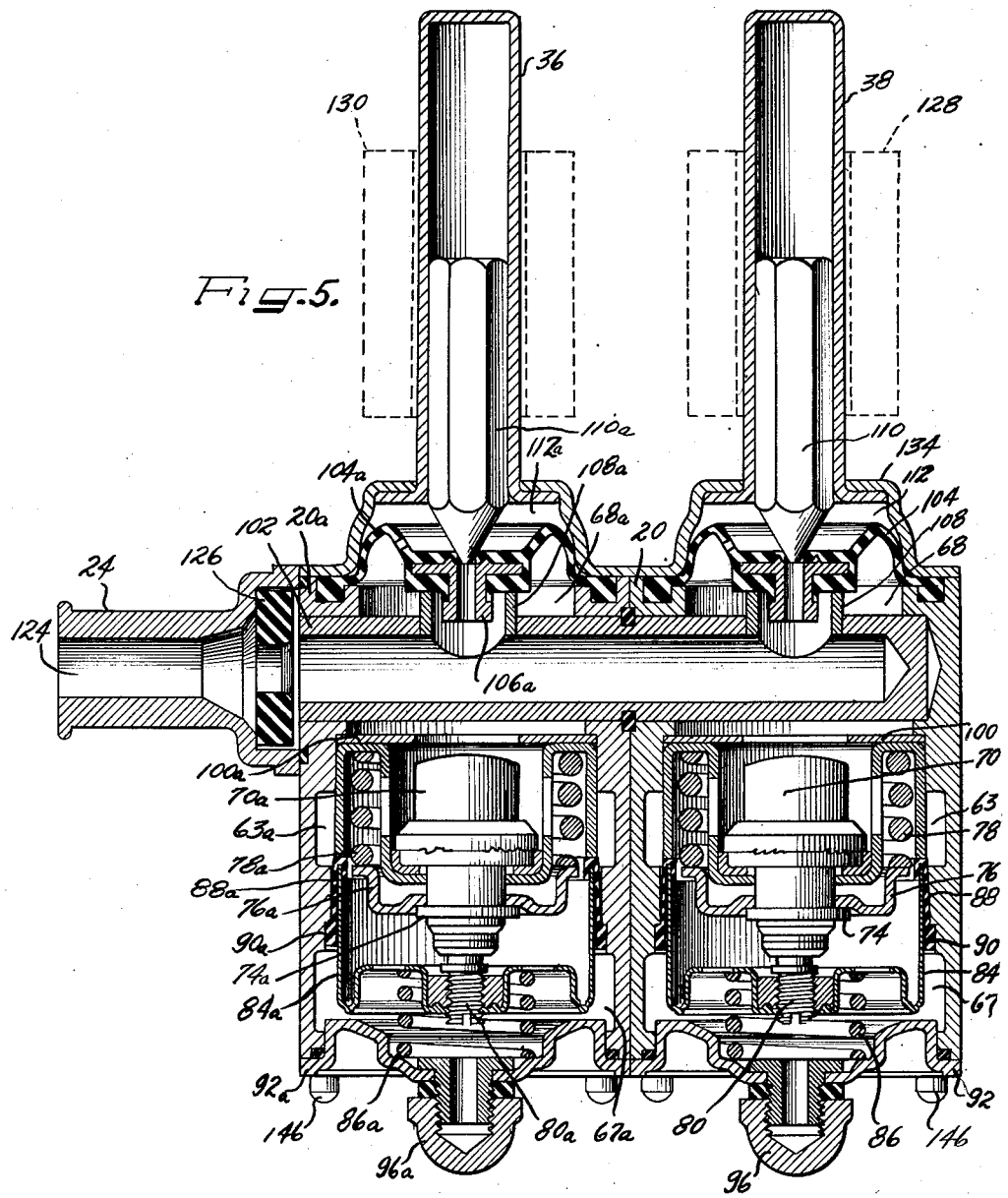

May 22, 1951 L. A. KEMPTON 2,553,769
DOUBLE MIXING VALVE
Filed Jan. 2, 1947 6 Sheets-Sheet 4
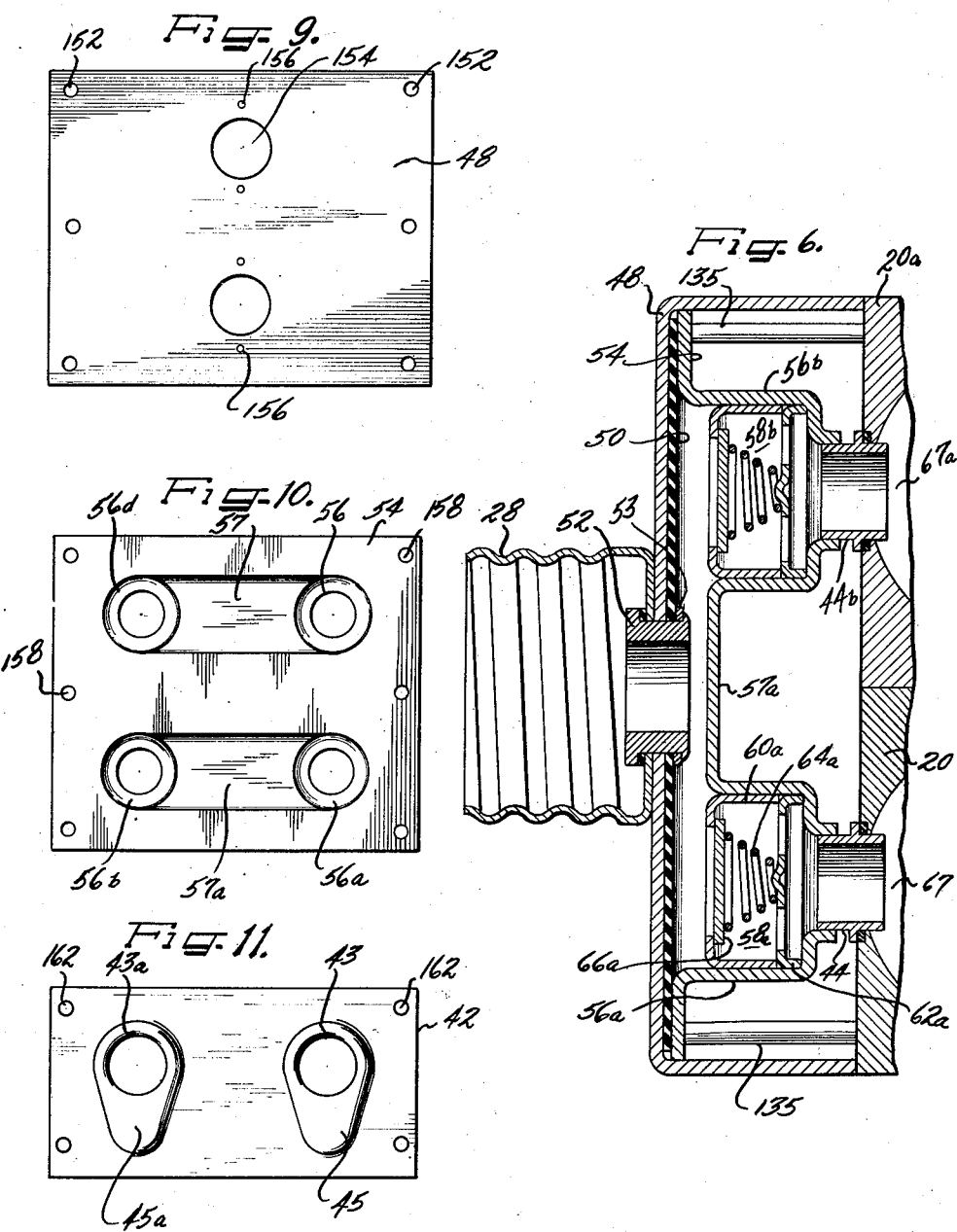
INVENTOR.
LESLIE A. KEMPTON
BY
Attys.

May 22, 1951     L. A. KEMPTON     2,553,769
DOUBLE MIXING VALVE

Filed Jan. 2, 1947     6 Sheets-Sheet 5

INVENTOR.
LESLIE A. KEMPTON

May 22, 1951 L. A. KEMPTON 2,553,769
DOUBLE MIXING VALVE

Filed Jan. 2, 1947 6 Sheets-Sheet 6

INVENTOR.
LESLIE A. KEMPTON
BY

Patented May 22, 1951

2,553,769

UNITED STATES PATENT OFFICE 2,553,769

DOUBLE MIXING VALVE

Leslie A. Kempton, St. Petersburg, Fla., assignor to The Dole Valve Company, Chicago, Ill., a corporation of Illinois Application January 2, 1947, Serial No. 719,828

5 Claims. (Cl. 277—60)

My invention relates to fluid mixing valves.

In one type of automatic fluid mixing valve, fluid from two separate sources at different temperature is admitted to a common mixing chamber containing a thermostatic control element. This element is connected to a valve mechanism for proportioning the quantity of fluid from the two separate streams so as to maintain the fluid in the chamber at a desired constant temperature. In one form of valve of this type, the so-called "double" type mixing valve, provision is made to select fluid streams of different temperatures, this being accomplished by providing two separate mixing chambers and thermostatic control elements therefor, together with flow control devices to select fluid from these chambers for passage to the outlet passageway. A fluid mixing valve of this type is disclosed in the co-pending application of Thomas B. Chace, Serial No. 513,610, filed December 9, 1943, now Patent No. 2,503,901, dated April 11, 1950, and assigned to the same assignee as the present invention.

It is an object of my invention to provide an improved double type thermostatically controlled fluid mixing valve.

Another object of my invention is to provide an improved double mixing valve which requires no intricate and expensive castings.

Further it is an object of my invention to provide an improved double mixing valve wherein the component parts may be manufactured by low cost stamping or machining operations from readily available stock material.

Another object of my invention is to provide an improved double type mixing valve that may readily be assembled by mass production operations.

It is yet another object of my invention to provide an improved double type mixing valve wherein the metal surfaces exposed to the flow of fluid are smooth, thus minimizing fluid friction and the tendency for deposits of dirt, salts, etc., thereon.

Yet another object of my invention is to provide an automatic fluid mixing valve wherein the various component parts may be placed in the fluid mixing cavity and the complete unit sealed by attaching an external closure device to provide the complete operative valve.

Still another object of my invention is to provide means external to a body and capable of being manufactured by simple, low cost stamping operations, which, when attached to the body, define fluid passages thereto, thereby eliminating the need of corresponding fluid passages within the body itself.

My invention further resides in features of construction, combination, and arrangement, whereby an improved double type mixing valve having inherently low cost is provided.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawings.

On the drawings:

Figures 1, 2 and 3 are top, side, and end views, respectively, of a double type fluid mixing valve constructed in accordance with my invention;

Figure 4 is a cross-sectional view through section IV—IV, Figure 3;

Figure 5 is a cross-sectional view through section V—V, Figure 2;

Figure 6 is a partial cross-sectional view through section VI—VI, Figure 3;

Figure 7:
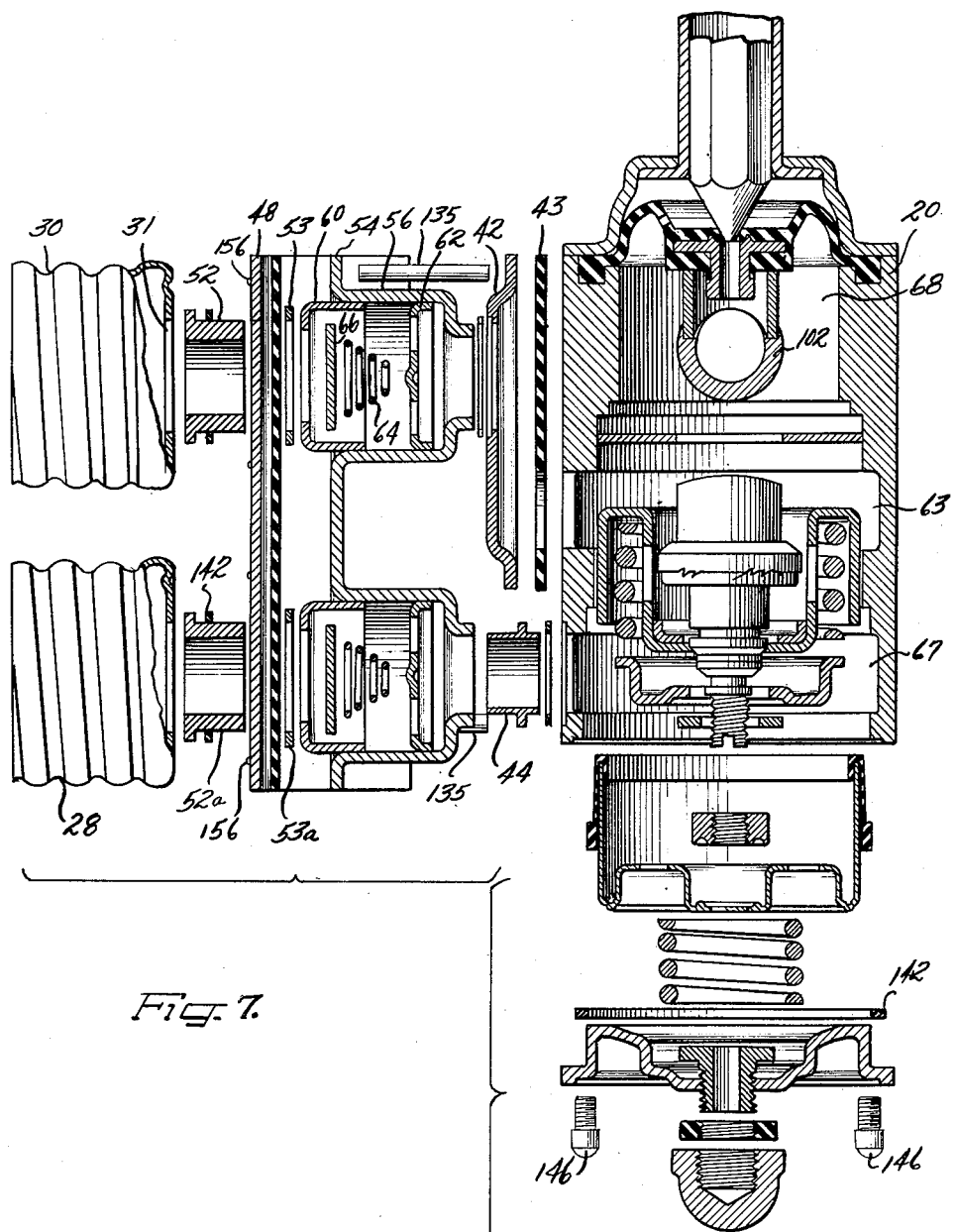
Figure 8:
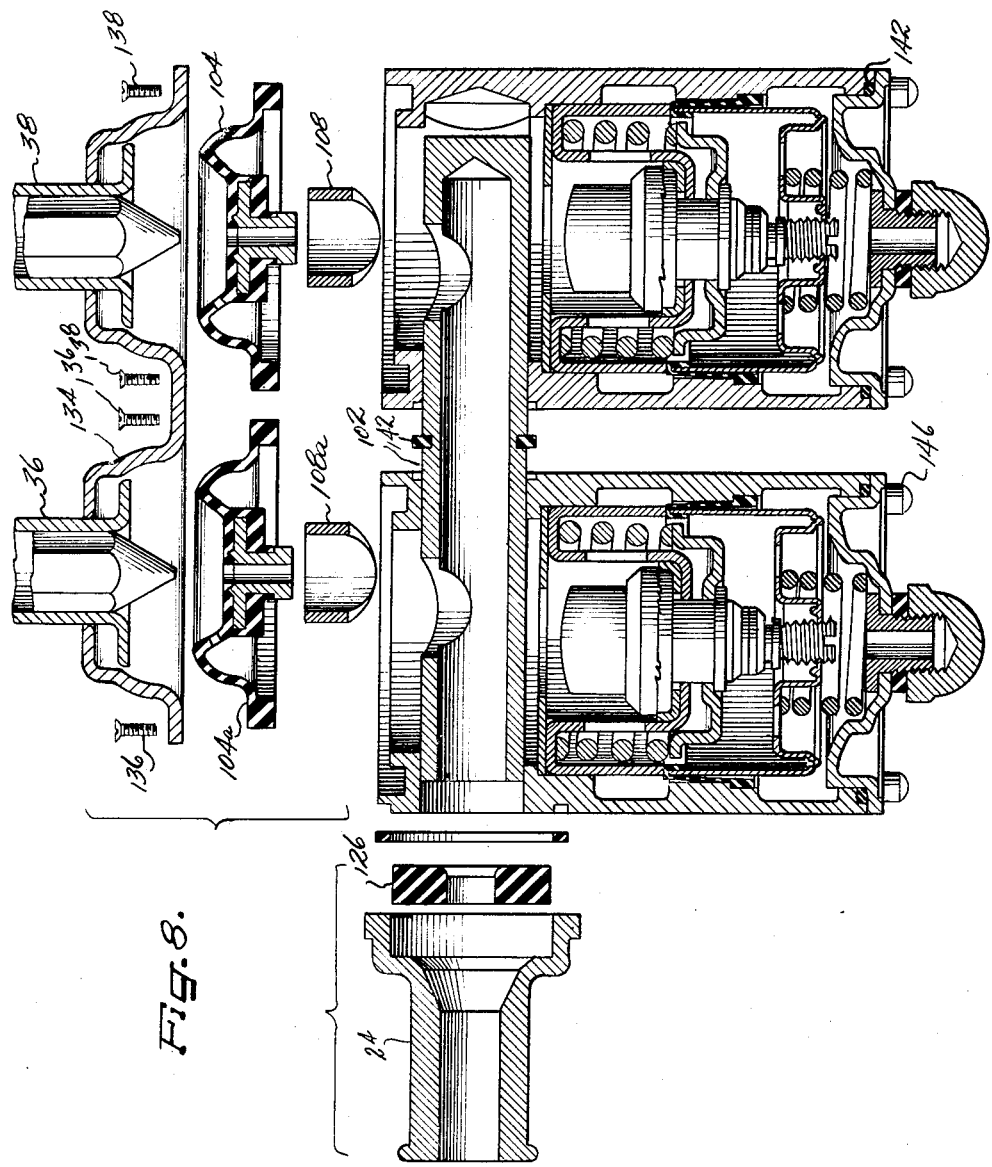

Figures 7 and 8 are views corresponding to Figures 4 and 5, respectively, except that the component parts of the mixing valve are spaced relative to each other to indicate in further detail the construction thereof; and Figures 9, 10 and 11 are plan views showing the construction of certain component elements forming the passageways of the valves of Figures 1–8.

As shown on the drawings:

In the top, end and side views of Figures 1, 2 and 3, respectively, the body members of the mixing valve are indicated at 20 and 20a, respectively. Each of these members contains a fluid mixing chamber and thermostatic control element therefor. The main fluid outlet member is indicated at 24, this member containing the outlet passage for fluid from the valve. Members 28 and 30 form the hot fluid and cold fluid inlet passages respectively, each having corrugations 32 on its outside surface to permit attachment of a hose thereto. As will be explained in further detail hereafter, members 36 and 38 contain control elements which may be used to open and close passageways within the fluid control valve and thus regulate the temperature of the fluid in the outlet passageways of member 24.

The various component elements of the valve structure and their co-operative arrangement with respect to each other, may best be understood by reference to Figures 4 and 5 which are cross-sectional views through sections IV—IV, Figure 3, and V—V, Figure 2, respectively. As will be evident from Figure 4, cold fluid inlet member 30 is attached to cover 48 and resilient spacer 50 by holding member 52. Similarly, member 28 is attached to cover member 48 and resilient spacer 50 by holding members 52 and 52a. As shown in the drawings, members 52 and 52a each consists of a pipe portion having an extending flange on either end so as to hold members 28 and 30 firmly in engagement with cover member 48 while permitting fluid flow from members 28 and 30. Fluid passage member 54 contains drawn portions 56 and 56a which form fluid passageways to contain the check valves shown generally at 58 and 58a. Check valve 58 consists of retaining members 60 and 62 in engagement with the inner surface of portion 56 of member 54, together with spring 64 and valve plate 66. In operation, if the fluid pressure in member 30, Figure 4, exceeds the pressure on member 66 associated with the bias force of spring 64 acting against member 62, together with the fluid pressure in the region about spring 64, member 66 swings to the open position and fluid passes therethrough. On the other hand, if the fluid pressure in member 30 is less than the pressure associated with the spring bias, together with the counterpressure of fluid about spring 64, the member 66 remains closed and no fluid flow can take place. Members 60a, 62a, 66a and spring 64a form a similar check valve within portion 66a of member 54. This acts in the same manner as the check valve within portion 56 to permit passage of fluid flow therethrough in one direction only and then only if suitable pressure is applied.

As shown in Figure 4, the portion 56 of member 54 terminates in passage member 42 which defines a passage against the side of body 20 to convey fluid to opening 63 in that member. Similarly, the portion 56a of member 54 terminates in an opening containing pipe 44 which is in communication with opening 67 of body 20. Thus, fluid can flow to the cavity 68 of member 20 either from member 30 through opening 63 or from member 28 through opening 67. Gasket 43 is provided between member 42 and body 20 to avoid fluid leakage about the connection between these two members.

It is the function of the apparatus contained within the lower portion of cavity 68 of body 20 automatically to mix the fluid streams from inlets 28 and 30 to provide a fluid of desired temperature. To this end, a temperature sensitive element, shown generally at 70, is provided, this element being of the type wherein the length varies in accordance with the temperature. This member is contained within housing 72 and is held in place by engagement between the annular extension 74 and the retainer 76. The latter member is biased by spring 78 so as continually to urge extension 74 in a downward direction relative to the main body of temperature sensitive element 70, thus holding this element in position by the engagement thereof with the inwardly extending portion 73 of housing 72. Extension 80 of temperature sensitive element 70 is held in threaded engagement with collar 82, this collar being attached to valve or flow adjusting member 84 by engagement with the inner cap portion 83 of that member. Spring 86 biases member 84 in the upward direction as seen in Figure 4 so as to oppose the action of element 70 and to return valve 84 to the upward position as element 70 contracts. Member 88 is a flexible boot of rubber or similar material which passes over the upwardly extending portion 85 of member 84 and is anchored by engagement of the annular extension 90 with the outwardly recessed portion 91 of cavity 68. Boot 88 is constructed so that it is stretched in the position shown in Figure 4, thus downwardly biasing valve 84 and causing the boot to follow downward motion of valve 84 and provide an annular opening between the inner surface of the aperture 63 and cavity 68 when member 84 moves downwardly.

Spring 86 is restrained at its lower end by closure member 92 which is attached to the bottom end of body 20. Closure member 92 also contains adjusting member 94 which is held tightly in place by engagement of its threaded portion with nut 96 and gasket 98. By removing nut 96 and inserting a screw driver in the opening of member 94 to rotate portion 80 of element 70, it is possible to adjust the position of member 84 relative to control element 70 and thus to vary the temperature of the regulated fluid within cavity 68.

Control element 70 may be any of the various types well known in the art in which the length varies with the temperature changes. The particular structure shown in the figure is adapted to be used in the so called "Vernet" type element in which the length change in temperature results from change in the crystal structure of a substance contained within the unit. This change or transformation produces powerful expanding action which is exerted between the annular extension 74 and the extension 80, thereby controlling the position of member 84.

In the operation of the above described mechanism to maintain fluid at constant temperature within cavity 68, the temperature sensitive element 70 experiences increased length between annular extension 74 and extension 80 when the fluid temperature rises. This forces flow adjusting member 84 downwardly against the action of spring 86, thus closing the opening between aperture 67 and cavity 68, thereby reducing the supply of hot water to cavity 68 and reducing the fluid temperature therein. Simultaneously, the upper portion of flow adjusting member 84 moves downwardly to cause the rubber boot 88 to provide a passage of greater area between the downwardly extending portion 75 of housing 72 and the upper surface of boot 88, thus to enable greater flow of cold fluid from passage 63 to cavity 68. Thus, any tendency of the fluid within cavity 68 to increase in temperature is counterbalanced by decreased flow of hot fluid thereto and increased flow of cold fluid. Similarly, if the temperature within cavity 68 decreases relatively more hot fluid is supplied thereto than cold fluid. The unit accordingly acts to maintain constant fluid temperature within the cavity.

If for any reason such as loss of cold fluid supply, the temperature within cavity 68 should become uncontrollably great, damage to the unit from excessive expansion between annular extension 74 and extension 80 is avoided by compression of spring 78. Thus, this spring not only acts as a means to hold unit 70 in place but also acts as a safety device to prevent damage to the unit from the excessive temperatures.

Housing 72 is restrained from upward motion in cavity 68 by washer 100 which contains an aperture to provide for passage of fluid and forms an inwardly directed flange about that passage. The outer rim of washer 100 engages wall 101 of cavity 68, this wall being formed between the adjacent cylindrical bores of different size at this portion of the cavity. From the upper portion of cavity 68, fluid passes to outlet pipe 102 through the fluid operated cut-off valve comprising flexible member 104, insert 106 and outlet pipe 108. Actuating member 110 permits selective opening and closing of the fluid operated shut-off valve system.

The fluid operated shut-off valve portion of the mixing system is shown in the shut-off condition in Figure 4. In this condition, the fluid pressure within cavity 68 is communicated to chamber 112 by a small opening 114 in flexible member 104. So long as little fluid flow takes place the pressure drop through opening 114 is small and the total downward force of the central portion of member 104 due to the fluid pressure of the upper surface 115 exceeds the net upward force associated with the pressure on the under surface 116. This results from the fact that no significant pressure exists in pipe 108 while substantially the same pressure exists in chambers 68 and 112 by reason of passage 114. If, however, member 110 is moved in the upward direction, as, for example, by the pull associated with a current carrying solenoid wound about member 38, the passage within portion 106 of flexible member 104 is opened and fluid flows therethrough from chamber 112. Fluid likewise flows through opening 114 in member 104. Inasmuch as the opening 114 is incapable of passing much fluid without considerable pressure drop, the pressure within chamber 112 is greatly decreased relative to the pressure in chamber 68 and a net upward force acting upon flexible member 104 is produced. This causes member 104 to rise, thereby opening a fluid passage between the under surface thereof and the lip portion of pipe 108. Fluid then flows through this passage to outlet pipe 102.

Further details of the construction of the fluid control valve will be evident from examination of Figure 5 which shows a cross-sectional view through section V—V, Figure 2. In this view, body 20a is shown as well as body 20. The former body contains a cavity 68a similar to the cavity 68 in body 20. In addition, temperature control and fluid control elements are disposed within this chamber in the same way as in the case of cavity 68 and operate in the same manner. Elements corresponding to those above described with reference to cavity 68 are therefore indicated by corresponding numerals with the suffix "a" added and the operation thereof will be evident from the above description with reference to cavity 68. Similarly, a fluid operated shut-off valve is provided at the upper end of cavity 68a, this valve having the same mode of operation as the valve described above with reference to Figure 4 and corresponding parts are indicated by the suffix "a".

The dotted lines of Figure 5 further show solenoids 128 and 130 disposed about members 36 and 38, respectively. Current flow in either of these solenoids produces a magnetic field tending to raise member 110 or member 110a, thereby controlling the entrance of fluid to outlet pipe 102. Thus, if current flows in solenoid 128 only, the fluid temperature in outlet passage 124 will be that corresponding to fluid within cavity 68 of body 20, whereas if current flow takes place in both solenoids, the temperature of the fluid in the outlet passage 124 will be modified by the fluid flow through member 108a. Similarly, if current flow is through solenoid 128 only, the temperature of the fluid in passage 124 will correspond with the temperature in cavity 68a. Thus, current flow through the solenoids controls the temperature of the outlet fluid.

It will be observed that a common fluid outlet from the cavities 68 and 68a in members 20 and 20a, respectively, is provided by pipe 102. Fluid from the cavities is selectively admitted to this pipe by means of the fluid operated cut-off valves connected to feed pipes 108 and 108a. As will be described in further detail hereafter, this construction provides a high degree of simplicity as pipe 102 may be inserted into a cylindrical opening provided for the purpose through body members 20 and 20a.

A resilient annulus 126 is located between pipe 102 and member 24 so as to control the total amount of fluid flow from the valve unit. The metering or flow control action of annulus 126 results from the fact that increased pressure within pipe 102 results in deformation of the annulus so as to reduce the minimum area of the opening therein and hence tend to maintain constant fluid flow through passage 124. That is, as the pressure in passage 102 increases relative to the pressure in passage 124, thereby tending to increase the fluid flow through annulus 126, the annulus deflects in accordance with the pressure and produces a restricted passage capable of passing only a limited amount of fluid. By proper design of the annulus 126 relatively to the physical characteristics of the material of which it is formed, the fluid flow can be made nearly independent of the pressure in member 102 as compared with the pressure in passage 124.

As shown in Figure 5, closure 134 defines the chambers 112 and 112a above the cavities 68 and 68a, respectively. This closure further holds members 36 and 38 in place as well as anchoring flexible members 104 and 104a. As shown in Figure 1, closure 134 is attached to bodies 20 and 20a by screws 136 and 138, respectively, thus anchoring this member relative to bodies 20 and 20a and holding these bodies in fixed position relative to each other.

As shown in Figure 2, member 24 is attached to body 20a by screws 140. Similarly, cover 48 is attached to bodies 20 and 20a by screws 132 and 133, respectively, each of these screws engaging a threaded opening in the corresponding body. Hollow rods 135, Figures 4 and 6, provide the requisite spacing between cover 48 and bodies 20 and 20a. It will be observed that cover 48 supplements the action of closure member 134 in holding members 20 and 20a in spaced relationship with each other.

Figure 6 shows how the members 28 and 30 are arranged to admit fluid to both cavity 68 and cavity 68a. This view is a cross section view through line VI—VI, Figure 3, and, while it specifically shows the arrangement with respect to member 28, it likewise shows the arrangement with respect to member 30 which is substantially identical therewith. As shown in Figure 6, the member 54 has, in addition to drawn portion 56a, a corresponding drawn portion 56b, terminating in pipe 44b similar to pipe 44. The former pipe is in communication with opening 67a in body 20a in the same manner that pipe 44 is in communication with opening 67 in body 20. Thus fluid can flow from member 28 either to opening 67 of body 20 or passage 67a of body 20a. The fluid check valve shown generally at 58b is similar in construction to that shown at 58a and enables independent fluid flow to the openings 67 and 67a. A similar arrangement of elements is provided to convey fluid from member 30 to flow passage 63 of body 20 and passage 63a of body 20a, thereby allowing fluid flow to both passages.

The construction of members 48, 54 and 42 can best be understood by reference to Figures 9, 10 and 11, which are plan views of these members. As shown in Figure 9, member 48 is provided with a plurality of openings 152 to accommodate screws 132 and 133, together with openings 154 to accommodate members 52 and 52a, respectively. In addition projections 156 are provided to secure members 28 and 30 from rotation relative to member 48 and the body of the complete valve unit. These projections fit into corresponding depressions in members 28 and 30, as shown in Figure 7.

Figure 10 shows a plan view of member 54. As shown in this view, this member has four drawn portions, 56, 56a, 56b and 56d. Each of these is of size to accommodate a check valve and terminates as shown in Figures 4 and 6, in an opening of size to accommodate pipes 44, 44b, the opening 43 in member 42, Figure 11, or the opening 43a in member 42. Between drawn portions 56 and 56b and drawn portions 56a and 56b are located partially drawn portions 57 and 57a which constitute regions of partial inward extension. The amount of depression of these portions, relative to portions 56, 56a, 56b and 56d will be evident from Figure 6 which shows a cross section view of this unit along the axis of portion 57a. In addition, member 54 has openings 158 to accommodate screws 132 and 133.

Figure 11 is a plan view of valve passage member 42. As shown in this view, this member has openings 43 and 43a to accommodate the lips of drawn portions 56 and 56d of member 54. Drawn portions 45 and 45a surround openings 43 and 43a. As will be evident from Figure 4, portions 45 and 45a, acting in conjunction with the drawn portions 56 and 56d of member 54, together with the sides of members 20 and 20a define a fluid passageway from member 30 to openings 63 and 63a in body members 20 and 20a, respectively. This permits passage of fluid from member 28 to cavities 68 and 68a through openings 63 and 63a, respectively. Member 42 is further provided with holes 162 to accommodate screws which hold it in place relative to body members 20 and 20a.

The method of constructing the fluid control valve of Figures 1 to 5 is illustrated in Figures 7 and 8 which correspond to Figures 4 and 5, respectively, but show the parts in spaced or exploded relationship. As shown in Figure 7, the cavity 68 in body 20 is symmetrical about the axis through that member except for apertures 63 and 67 and the opening containing pipe 102. Thus, this cavity may be machined by simple machining operations as, for example, by mounting body 20 to rotate on a lathe and inserting the cutting member of the lathe inside body 20 to cut cavity 68 in accordance with the desired shape. It will be observed that the cutting operation only requires different diameters of cut about the same axis, an operation that is relatively simple to perform. The annular portions of openings 63 and 67 may be made in this fashion while the communicating portions for connection of pipe 44 and member 42, together with the opening required for pipe 118, may be drilled, the axis of the drill being normal to the axis of cavity 68. From Figure 8 it will be evident that cavity 68a and body 20a may be similarly produced, since this cavity includes only cylindrical sections symmetrical about the axis therethrough and corresponding with the sections of cavity 68 of body 20.

Figures 7 and 8 further show the assembly of elements within cavities 68 and 68a. These members are all loosely mounted within these cavities and held in place by their mutual engagement when closure members 92 and 92a are attached to bodies 20 and 20a by screws 146, Figure 2. Thus, the assembly operation may be completed by simply arranging the elements as shown in Figure 7 and pressing them together to the condition of Figures 4 and 5 by fixing closure members 92 and 92a in place. Inasmuch as none of the elements require fixed angular relationship with respect to each other, and the desired axial alignment is easily produced as the elements are compressed, this assembly operation requires no time consuming exact positioning of the parts and lends itself to a mass production assembly.

The assembly of members 30, 28, 48, 54, and 42 is shown in Figure 7. As shown in this figure, pipe 52 may be passed through the opening 31 of member 30, through the opening 154, Figure 9, of member 48 and washer 53 and the end peened over to anchor the complete unit in place. The completed assembly is shown in Figure 4. After this assembly, elements 60, 66, 64 and 62 may be inserted in portion 56 of member 54. A convenient method of holding these members in place is to construct them to achieve a tight mechanical fit between members 60 and 62 and portion 56 of member 54. Alternatively, anchoring means, such as depressions pounded in portion 56 of member 54 after members 60 and 62 are in place may be used. Member 42, together with flexible washer 43, then may be attached to members 20 and 20a by screws through openings 162, Figure 11. It is then possible to complete the assembly by screws 132 and 133, together with rods 135 as shown in Figures 3 and 4.

Figure 8 shows how closure member 134, together with members 36 and 38, diaphragms 104 and 104a, and pipes 108 and 108a may be assembled and held in place by screws 136 and 138, Figure 1. In addition, this view shows how pipe 102 may be inserted through aligned openings in members 20 and 20a. As is fully evident from this figure, member 24, when attached to member 20a by screws 140, Figure 2, holds the resilient annulus 126 in place.

Gaskets 142 are provided between the various components in the valve to prevent leakage of fluid therebetween, thereby avoiding the need for precise mechanical fittings to avoid leakage.

From the above description it will be evident that my invention provides an improved double type fluid mixing valve wherein no castings are required and which may be assembled with ease. In particular, the various components used in the valve such as members 104 and 104a, springs 86 and 86a, resilient annulus 126, etc., may be standard parts used in this type of valve as well as other valves intended for similar or related purposes. Special members, such as 42, 48, 54, and 134 may be stamped from sheet metal by rapid low cost mass production methods. Finally, the bodies 20 and 20a may be produced from standard metal stock by simple machining operations. The net result of this construction, as contrasted with the castings heretofore used, is to reduce the cost of the completed valve to as little as one-half the cost of the equivalent valve using castings.

It will further be observed that the surfaces exposed to fluid flow within the valve are all machined surfaces that may be readily machined to a smooth condition, thereby offering minimum impedance to the passage of fluid therethrough and introducing the least possible tendency towards deposit thereon of undesired material from the fluid.

While I have shown a particular embodiment of my invention, it will, of course, be understood that I do not wish to be limited thereto since many modifications both in the elements employed and the co-operative relation may be made without departing from the spirit and scope thereof. I, of course, contemplate by the appended claims to cover any such modifications as fall within the true spirit and scope of my invention.

What I claim as new and desire to secure by letters patent of the United States is:

1. In a valve structure, a hollow valve body having two inner wall portions defining a plurality of valve chambers each having a valve element slidable therein and having inlets into said chambers from a common plane surface of said valve body and each having an outlet therefrom, a cover member detachably mounted on said valve body and affording fluid tight passageways into said chambers from a common fluid inlet, said cover member having a closure plate spaced from said valve body, a fluid inlet through said cover member, and a passageway defining member interposed between the inside of said cover member and said valve body and including an outer flanged portion engageable with the inside of said cover member and two spaced annular chamber-like portions extending therefrom and having communication with and interengaging connection with said inlets through said valve body, and said passageway defining member being so constructed and arranged with respect to said cover member and valve body that securing of said cover member to said valve body will maintain said passageway defining member in fluid tight engagement therewith and with said passageways into said valve body.

2. A valve structure comprising a hollow valve body having two inner side walls defining valve chambers and having inlets into said valve chambers from a common wall thereof, and each chamber having an outlet from an end thereof and a valve element therein, a cover member detachably mounted on said valve body and having a closure plate spaced from said valve body, a fluid inlet through said cover member and a passageway defining member interposed between the inside of said cover member and said common wall and having a peripheral flange adapted to have fluid tight engagement with the inside of said cover and having two spaced annular drawn chamber like portions extending therefrom, having relatively large receiving ends and reduced discharge ends having interengaging connection with said inlets into said valve body, said cover member and passageway defining member forming a detachable manifold for said valve block, and said fluid tight connections being maintained by engagement of said cover member with said passage defining members.

3. A valve structure comprising a hollow valve body having two inner side walls defining valve chambers having valve elements therein and having inlets into said valve chambers from a common wall thereof and each having outlets therefrom, a cover member for said common wall of said valve body having a closure plate spaced from said valve body, a fluid inlet through said closure plate, and means interposed between the inside of said closure plate and said common wall and maintaining fluid tight passageways between said inlet through said closure plate to said inlets into said valve body, including a passageway defining member having a peripheral flange adapted to have fluid tight engagement with the inside of said cover and having two spaced annular drawn chamber-like portions extending therefrom and having relatively large receiving ends and reduced discharge ends, fluid conducting members connected to said reduced discharge ends and an interengaging connection between said fluid conducting members and said inlets into said valve body.

4. A valve structure comprising two hollow valve bodies the inner walls of which define mixing chambers having valve elements therein, fluid inlets opening from a common plane outer surface into said chambers, fluid outlets from said chambers, and means providing a common inlet passageway through both of said inlets from a source of fluid supply and securing said valve bodies in aligned relation with respect to each other including a cover member having a closure plate spaced from said valve bodies, and having depending side walls adapted to have engagement with the common plane surface to said valve bodies, an inlet through said closure plate, and a passageway defining member abutting the inside of said closure plate at one of its sides in communication with said inlet and maintained in fluid tight engagement therewith by engagement of said cover member with said valve bodies, said passageway defining member having two spaced inwardly extending wall portions having inter-engaging connection with said inlets into said valve bodies and held in engagement therewith by said cover member and defining passageways from said inlet through said closure plate to said inlets to said valve chambers, and maintaining said valve chambers in aligned relation with respect to each other.

5. In a valve structure, two hollow valve bodies having plane outer surfaces adapted to be held in abutting relation with respect to each other and a common plane outer surface perpendicular to said abutting plane surface, said valve bodies having inner walls defining valve chambers having valve elements therein and each having an inlet from said common plane surface into said chambers and having outlets therefrom, and means providing a common fluid passageway from a source of fluid supply through said inlets into said chambers including a cover member having a closure plate spaced from said valve bodies and having side walls extending therefrom and adapted to have engagement with the common plane outer surface thereof, and a passageway defining member having a peripheral flanged portion abutting and having fluid tight engagement with the inside of said closure plate, and having a central portion spaced from said closure plate having two annular chamber like portions extending therefrom with reduced annular end portions having inter-engaging connection with said inlets into said valve bodies and serving to hold said valve bodies in aligned relation with respect thereto and to afford inlets thereinto, and means securing said closure member to said valve bodies and holding said passageway defining member in fluid tight engagement therewith.

LESLIE A. KEMPTON.

REFERENCES CITED

The following references are of record in the file of this patent:

UNITED STATES PATENTS

| Number | Name | Date |
|---|---|---|
| 821,827 | Penberthy | May 29, 1906 |
| 1,342,719 | Rodriguez | June 8, 1920 |
| 1,797,591 | Sartakoff | Mar. 24, 1931 |
| 1,954,903 | Walker | Apr. 17, 1934 |
| 2,045,657 | Karmazin | June 30, 1936 |
| 2,247,140 | Twyman | June 24, 1941 |
| 2,291,637 | Kohlmann | Aug. 4, 1942 |
| 2,317,717 | Bauman | Apr. 27, 1943 |
| 2,321,573 | Chace | June 15, 1943 |
| 2,425,788 | Edwards | Aug. 19, 1947 |
| 2,456,094 | Victoreen | Dec. 14, 1948 |